(12) United States Patent
Durrant (10) Patent No.: US 9,869,069 B2
(45) Date of Patent: Jan. 16, 2018

(54) ANTI-SCOUR SYSTEM

(75) Inventor: Robert Henry Durrant, Martham, Great Yarmouth (GB)

(73) Assignee: Scour Prevention Systems Ltd., Lowestoft, Suffolk (GB)

( * ) Notice: Subject to any disclaimer, the term of this patent is extended or adjusted under 35 U.S.C. 154(b) by 263 days.

(21) Appl. No.: 13/202,714

(22) PCT Filed: Feb. 23, 2010

(86) PCT No.: PCT/EP2010/001116
§ 371 (c)(1),
(2), (4) Date: Aug. 22, 2011

(87) PCT Pub. No.: WO2010/097199
PCT Pub. Date: Sep. 2, 2010

(65) Prior Publication Data
US 2011/0305510 A1 Dec. 15, 2011

(30) Foreign Application Priority Data
Feb. 24, 2009 (GB) .................................. 0903068.5

(51) Int. Cl.
*E02B 3/12* (2006.01)
*E02B 17/00* (2006.01)

(52) U.S. Cl.
CPC .......... *E02B 17/0017* (2013.01); *E02B 3/121* (2013.01); *E02B 2017/0065* (2013.01);
(Continued)

(58) Field of Classification Search
CPC .. E02B 17/0017; E02B 2201/04; E02B 3/121; E02B 3/122
(Continued)

(56) References Cited

U.S. PATENT DOCUMENTS 3,764,446 A * 10/1973 Martin ............................ 405/16
3,983,705 A 10/1976 de Boer
(Continued)

FOREIGN PATENT DOCUMENTS

BE 1004666 A3 1/1993
FR 2643400 A1 * 8/1990 ............... E02B 3/04
(Continued)

OTHER PUBLICATIONS

Database WPI Week 198510, Thomson Scientific, London, GB, 1985-061410, XP-002587451; PCT/EP2010/001116 International Search Report.

*Primary Examiner* — Frederick L Lagman
(74) *Attorney, Agent, or Firm* — Berliner & Associates (57) ABSTRACT

Seabed scour about a seabed-mounted foundation or renewable energy device or anchor therefore, especially a wind-turbine monopile may be prevented or reduced by installing on or in the seabed area about the foundation or device an arrangement of interconnected sedimentation elements, which by virtue of the elemental structure or interconnective arrangement themselves do not cause or worsen seabed scour by substantially displacing seabed material on which the elements are placed. Elements having a specific gravity, either in situ or inherent, of substantially similar to the seabed material or mobilized seabed material in which they are placed are capable of achieving this. An ideal arrangement of elements (or mat) is one formed of used or discarded vehicle tires.

10 Claims, 6 Drawing Sheets

(52) U.S. Cl.
CPC ... *E02B 2017/0091* (2013.01); *E02B 2201/04* (2013.01); *Y02W 30/687* (2015.05)

(58) Field of Classification Search
USPC .... 405/211, 15, 16, 17, 19, 30, 302.4, 302.6
See application file for complete search history.

(56) References Cited

U.S. PATENT DOCUMENTS

| | | | | |
|---|---|---|---|---|
| 4,080,793 | A | * | 3/1978 | Pulsifer ............... 405/30 |
| 4,139,319 | A | * | 2/1979 | Anderson ............ 405/16 |
| 4,188,153 | A | * | 2/1980 | Taylor ................. 405/30 |
| 4,632,600 | A | * | 12/1986 | Ito ....................... 405/30 |
| 4,717,286 | A | * | 1/1988 | Loer .................... 405/211 |
| 4,850,738 | A | * | 7/1989 | Niemi ................. 405/302.7 |
| 5,178,489 | A | * | 1/1993 | Suhayda ............. 405/16 |
| 5,214,896 | A | | 6/1993 | Hamilton |
| 5,370,475 | A | | 12/1994 | LeBlanc |
| 5,370,476 | A | * | 12/1994 | Streichenberger ... A01K 61/006 405/15 |
| 5,762,448 | A | | 6/1998 | Bilanin |
| 5,807,023 | A | * | 9/1998 | Krenzler ............. 405/21 |
| 5,846,023 | A | | 12/1998 | Angel et al. |
| 6,213,687 | B1 | * | 4/2001 | Broughton et al. .... 405/16 |
| 6,268,035 | B1 | * | 7/2001 | Carpenter ........ B29B 17/0042 405/16 |
| 6,375,387 | B1 | * | 4/2002 | Gabor et al. ........ 405/16 |
| 6,533,501 | B1 | * | 3/2003 | Callinan et al. ..... 405/302.6 |
| 6,705,803 | B2 | * | 3/2004 | Callinan et al. ..... 405/16 |
| 7,258,326 | B2 | * | 8/2007 | Talbott ................ 405/284 |
| 2003/0156906 | A1 | * | 8/2003 | Callinan et al. ..... 405/229 |
| 2004/0265060 | A1 | | 12/2004 | Lee et al. |
| 2005/0077506 | A1 | * | 4/2005 | Talbott ................ 256/13.1 |
| 2005/0236609 | A1 | * | 10/2005 | Talbott ................ 256/1 |

FOREIGN PATENT DOCUMENTS

| | | | | |
|---|---|---|---|---|
| GB | 1472486 | | 5/1977 | |
| GB | 1523552 | A * | 9/1978 | ......... E01F 15/0453 |
| GB | 2035504 | A * | 6/1980 | ............. E02B 3/04 |
| JP | 11269849 | | 10/1999 | |
| NL | 1005744 | C1 * | 10/1998 | ............ E01C 3/006 |
| SU | 1108158 | | 8/1984 | |

* cited by examiner

ANTI-SCOUR SYSTEM

FIELD OF THE INVENTION

This invention relates to the field of tidal scour around marine structures, including seabed mounted foundations and devices and sub-marine cables and pipelines, and especially monopile (or tri-pile) mounted structures such as off-shore wind turbines. In particular, it relates to a method of controlling and/or preventing tidal scour about a monopile (or tri-pile) mounted marine structure or sub-marine cables or pipelines, to an anti-scour device for use in such a method and to a method of assembling an anti-scour device.

BACKGROUND OF THE INVENTION

Renewable Energy is of increasing importance to national and global energy policies and methods for harnessing renewable energies are attracting increasing amounts of investment. Marine renewable energy devices are an important part of the energy mix, particularly for countries with a good marine resource. Such marine renewable devices include tidal energy devices, wave energy devices and off-shore wind turbines.

Wind turbines (or wind-powered electricity generators or other wind energy capture devices) are typically multi-blade devices (usually three blades) mounted on a tower which is fixed in place with a monopile (or, increasingly for larger sized turbines, tri-pile foundations). The wind turbine tower is subject to various stresses arising from the movement of the substantial blades and from exposure to variable wind conditions. These stresses can cause movement of the towers which can then cause the towers to vibrate. Such vibrations can cause structural failure of the wind turbine or lead to increased maintenance requirements. Monopile mounted devices vibrate according to the modes of natural frequency of the system (especially the first and second modes), which is a function of the height of the monopile and the weight distribution across the device (as well as other factors). It is known to minimise the vibrations in a system and to dampen the vibration of a wind turbine tower by suspending a certain mass within or in association with the tower at a certain height (which damping mechanism may capture the energy of vibration by oscillation of the suspended mass). Off-shore wind turbines, however, which are monopile mounted are susceptible to sea-bed scour (e.g. by tidal variations or due to stormy weather), which removes an area of sea-bed about the base of the wind turbine monopile. This can, in effect, cause the height of the wind turbine to vary according to the degree and severity of sea-bed scour with the result that the optimal position and configuration of vibrational damping systems may vary (with resultant increase maintenance to review and vary damping configurations and/or increased risk of structural damage to the device).

It is therefore of utmost importance to ensure that the scouring about the monopile base and related structural integrity, vibrational variations, maintenance and possible structural damage are minimised.

Tidal energy devices designed to capture the regular and predictable tidal energy may be sea-bed mounted, optionally via an anchor or one or more sea-bed piles. Since tidal energy devices are typically located in areas of high tidal currents (to maximise energy capture), their anchor arrangements are particularly susceptible to tidal scour which may cause loosening of the anchor or sea-bed mount and resultant movement and damage or hazard from the device. The process of scouring may also result in inefficiencies in the operation of tidal energy devices.

Again, ensuring that the scour about seabed anchors for tidal or wave energy capture devices is important to prevent instability in the system and resultant damage.

Methods and materials for seabed scour protection exist and attempts have been made to address scoured seabed problems associated with seabed mounted structures.

Around wind turbine monopiles without scour protection, scour depths about the monopile of more than twice the diameter of the monopile have been observed, which presence of scouring requires monopiles of an extra 8-10 m in length to be utilised to ensure adequate structural stability and risks the vibrational variations, maintenance costs and damage referred to above. Scour can also leave a cable leading from a wind turbine exposed to turbulence and damage.

Scour protection for seabed-mounted off-shore wind turbines is a recognised problem and a significant cost of construction of such wind turbines is in the scour protection systems, which are recognised as being inadequate.

Typical offshore wind turbine scour protection may be approached in two ways: installing the wind turbine and then repairing scour that forms around the base (dynamic scour protection); or forming the scour protection before or immediately after installation (static scour protection). The scour protection typically takes the form of armour protection (e.g. a layer of rocks or large concrete elements), typically with rocks of diameter of the order of 50-100 cm, and a filter layer beneath of smaller stones or rocks having a diameter of the order of 10 cm. The protection may be of a meter or two in depth and may extend several meters in radius from the monopile.

However, it has been found that these traditional methods result in local scour at the extreme boundary of the scour protection area and the surrounding seabed, which can lead to undermining of the limits of the scour. It has also been found that the foundation of the scour protection has lowered about the base of the monopile, due to erosion of the sea-bed beneath the layer of scour protection (see, for example, Hansen et al, "Scour Protection around Offshore Wind Turbine Foundations, full-scale Measurements", EWEC 2007). Erosion about the monopile or tripod/tri-pile foundations of wind turbines has been shown to have a significant impact on the natural frequency of vibration of a wind turbine, particularly on the second mode of vibration (see, for example, M. B. Saaijer, "Tripod support structure—pre-design and natural frequency assessment for the 6MW DOWEC", doc. No. 63, TUD, Delft, May 2002).

There have been a number of efforts to improve scour protection. Fronded concrete mattresses have been proposed and found use in deepwater oil installations. However, this solution suffers from a number of disadvantages including a high cost of installation, the development of local scouring about the boundary of the concrete mattress, depression of the elements of the concrete mattress due to erosion of the seabed beneath and the inadequate performance of such devices in high energy shallow waters. Fronded fibre or textile mattresses are utilised about oil platform supports. These devices have fronds that are buoyant and extend upwards from the textile mat. Whilst having some effect in relatively low sea current environments, they suffer from certain disadvantages. In particular, in high current environments, the fronds are forced to a very shallow angle to the mat and lose a significant amount of their sediment trapping capability. In addition, in strong current flows, the seabed material about the edges and beneath the mat can be undermined leading ultimately to disturbance of the mat anchors and the fronded mat being unsecured and moving away with the currents.

There have been attempts to bypass some of the consequences of scouring. WO-A-2008/151660 describes a method for containing a cable leading from a wind turbine to shore (typically) which prevents the cable from being damaged from exposure in the event of scour about the base of the monopile. The tubing arrangement provided can be fed from above the water and is not distorted by scouring about the monopile (as is typical in a conventional J-tube arrangement), by being hingedly connected to a rigid tube leading outwardly from the monopile base into the seabed. Whilst this provides a solution to a problem caused by seabed scour, it does nothing to address the underlying scour problem.

It would be desirable to provide a method and/or apparatus for inhibiting or repairing scour about a sea-bed mounted foundation such as a monopile, e.g. in association with an offshore wind turbine, or anchoring of other marine renewable energy device, which method and/or apparatus overcame the aforementioned problems in a cost effective and readily applicable manner.

Problem to be Solved by the Invention

There is a need for improved methods and devices for the inhibition or correction of scour about the base of marine renewable energy devices, especially the foundations such as monopiles of offshore wind turbines, in a cost-effective and readily applicable manner.

It is an object of this invention to provide a method for scour protection including scour inhibition and/or correction, which is readily applicable and cost-effective.

It is a further object to provide a device for installing as a scour protection system or as part of a scour protection system in an effective and cost-efficient manner.

It is a still further object to provide a method and manner of manufacture and installation of such a device and/or implementation of such a method.

SUMMARY OF THE INVENTION

In accordance with a first aspect of the invention, there is provided a method for the inhibition or reduction of seabed scour about a seabed-mounted foundation or renewable energy device or anchor thereof, the method comprising providing in an area surrounding and/or adjacent to said seabed-mounted foundation or renewable energy device or anchor thereof an arrangement of interconnected sedimentation elements characterized in that the structural properties of the sedimentation elements and/or the interconnective arrangement of elements is such that the elements do not themselves cause further scour nor further displace supporting seabed material.

In a second aspect of the invention, there is provided a monopile, sea-bed mounted foundation, wind turbine or other marine renewable energy device or anchor thereof scour prevention and/or reduction system comprising an arrangement of interconnective sedimentation elements characterized in that the structural properties and/or interconnective arrangement of the sedimentation elements is such that in situ the elements do not themselves cause further scour nor further displace supporting seabed material.

In a third aspect of the invention, there is provided a seabed scour inhibition or reduction apparatus comprising a plurality of interconnected sedimentation elements, the sedimentation elements comprising at least two sediment trap components for trapping sediment in fluid flow in substantially differing directions, the elements arranged in close packed arrangement in a single layer.

In a fourth aspect of the invention, there is provided a sedimentation element having at least two sediment trapping portions capable of trapping sediment from fluid flowing in two substantially differing directions, the element having roof and/or base portion and a wall portion and having at least one aperture in the wall or roof to allow for the escape of air during placement in location.

In a fifth aspect of the invention, there is provided a use of a sedimentation element to inhibit or reduce scour about a seabed mounted foundation, offshore wind turbine pile, marine energy device or anchor thereof, the sedimentation element comprising one or more sedimentation trap components which provide a sedimentation trapping capability in situ in two substantially differing directions.

In a sixth aspect of the invention, there is provided a method of installing a scour protection system about a sea-bed mounted marine energy device, foundation or a monopile of an offshore wind turbine, the method comprising the steps of assembling a plurality of sedimentation element to form a scour inhibition device or a section of a scour inhibition device, providing a transporting frame for transporting the scour inhibition device or section thereof, the transporting frame having a plurality of device engagement means for releasable engagement with the device, releasably engaging the transporting frame with the scour inhibition device or section thereof, manoeuvring the transporting frame to the desired location, and releasing the scour inhibition device or section thereof to dispose the said device in the desired location in need of scour prevention.

In a seventh aspect of the invention, there is provided a transportation frame for transporting a scour inhibition device or section thereof, the frame comprising a longitudinal support and at least two lateral supports, the supports comprising a plurality of scour inhibition device element engaging means.

Advantages of the Invention

The method and system of the present invention enable a significant reduction in seabed scour about marine foundations such as wind turbine monopiles and tri-piles at low cost using an arrangement of interconnected sedimentation elements (an anti-scour mat) manufactured from readily available materials. The invention thereby addresses the significant and recognized problem in seabed mounted structures of tidal scour and, in the case of wind turbines, enables wind turbine tower vibrational dampening devices to work effectively in continuous operation due to control of any scour-related change in natural frequency of vibration, thereby reducing maintenance and risk of damage and turbine downtime.

DETAILED DESCRIPTION OF THE INVENTION

The invention provides a method and system for improved scour inhibition or prevention and/or correction or reduction about seabed mounted foundations or renewable energy devices or anchors therefor by utilizing sedimentation elements that have certain structural properties (or interconnective arrangements) which avoids the causing of further scour and/or displacement of seabed material by the element itself.

Preferably, the sedimentation element is, in situ, of substantially similar average specific gravity to the seabed material on/in which the scour prevention system is disposed. Alternatively or additionally, the sedimentation element may be partially buoyant or capable of partial suspension in the seabed material on which it is disposed or in a suspension of mobilized seabed particles in water, by virtue of the material's average specific gravity (being substantially similar to that of the seabed material) and/or by virtue of the suspensive effect of each sedimentation element being interconnected to one, two or more other sedimentation elements adjacent thereto. Without being bound by theory, it is believed that by interconnecting a sedimentation with one or more other elements, when a portion of seabed material located by or beneath said element is temporarily mobilized by local sea currents, the connection with other sedimentation elements may render the undermined element temporarily suspended or may slow its occupation of the vacated foundation, thereby allowing time for the foundation to be reoccupied by trapped sediment. It is further believed that by utilizing a sedimentation element having an average specific gravity of substantially similar to the seabed material on/in which it is disposed, the element is inhibited from displacing (or slow to displace) seabed material beneath it even when seabed material is mobilized by local sea currents. Preferably, the material from which the element is formed is of a specific gravity substantially similar to that of the seabed material. Optionally, the sedimentation element is configured in such a manner as to trap and contain a substantial amount of seabed material (relative to the size of the element) such that in situ the seabed material-filled element has a specific gravity substantially similar to the seabed material on which it is disposed.

Preferably, the sedimentation element has a specific gravity in the range from 1.05 to 2.5, more preferably 1.05 to 2 (where water has a specific gravity in standard conditions of 1 and sea water typically has a specific gravity of about 1.03), still more preferably 1.2 to 1.5, either in situ or, preferably, inherent.

The scour problems that the present invention solves are caused by sea currents about seabed mounted structures in an offshore environment exposed to strong tidal currents and/or exposed to storm energy.

The system and method of the present invention find utility in a range of offshore applications, including seabed-mounted foundations or seabed mounted or anchored devices. Seabed-mounted foundations include for example the foundations of offshore oil platforms or exploration and drilling platforms and the foundations of renewable energy devices such as wind turbines. Offshore wind turbines are typically mounted upon piles sunk into the seabed. These piles are usually monopiles, but increasingly for larger-sized turbines may be for example tri-piles. Seabed scour about the foundations of offshore wind turbines is a particular problem since the piles are sunk typically in seabed area in which a pile can readily be sunk. Such seabed types are particularly susceptible to scour by nature of the material. Seabed-mounted or anchored devices may include other renewable energy capture devices such as seabed-mounted wave power devices, seabed-anchored wave power devices (or power lines drawn therefrom) and seabed-mounted tidal power devices.

Preferably, the method and system of the present invention is for inhibiting and/or reducing scour about a foundation (e.g. monopile or tri-pile) of an offshore wind turbine.

A sedimentation element as used herein is an arrangement of one or more sedimentation trap component(s) which provide a sedimentation trapping capability in situ in two substantially differing, preferably substantially opposing, directions of liquid flow. Thus a sedimentation element will typically comprise at least two opposing trap components separated by a gap diameter or a single trap component with sufficient curvature to provide a sedimentation capability in two substantially opposing directions of flow.

Figure 1:
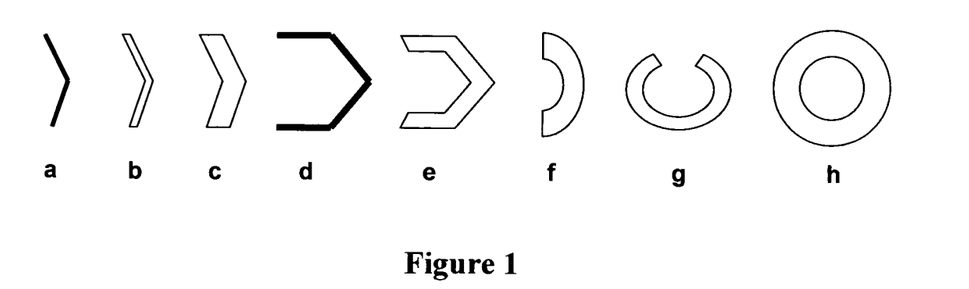
FIGS. 1a to 1h are plan view illustrations of optional portions of a sedimentation element for use in the present invention.
Figure 2:
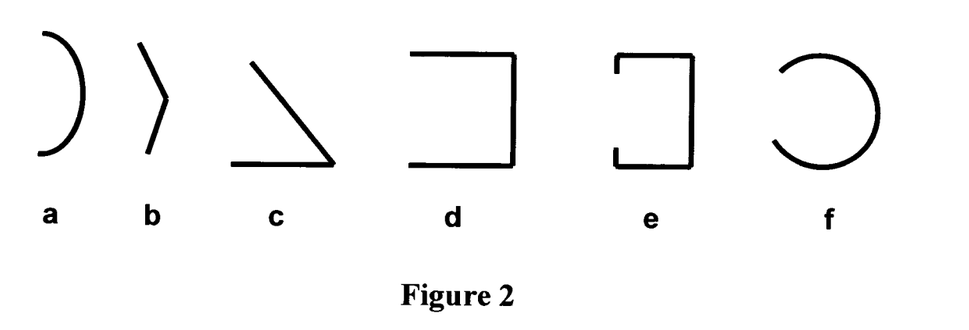
FIGS. 2a to 2f are cross-sectional side aspects of optional portions of a sedimentation element for use in the present invention

A sedimentation trap component in plan view preferably has a curved lateral capture shape, by which it is meant that the component defines a bay through its curved or angular concave arrangement. Examples of the shape of a sedimentation trap component in plan view are shown in FIG. 1 (*a-h*).

A sedimentation trap component preferably has a vertical capture shape, by which it is meant that in cross-section in the side aspect it has a shape inclined to cause sediment capture, e.g. by a concave or angled arrangement. Preferably the side aspect cross-sectional configuration of the element is angled or curved to form a wall portion and extending therefrom one or more radial elements which may be designated a base portion and/or a roof portion. A wall portion is defined as that part of the element, when in its orientation in use, having an angle within 45 degrees of the vertical. A roof portion or base portion is defined as that part of the element, when in its orientation in use, having an angle within 45 degrees of the horizontal. Unless the context requires otherwise, the base portion and roof portion may be interchangeably used and it should be understood that unless otherwise clear from the context, the roof portion may be the base portion simply by reversing the orientation of the element (especially in symmetrical elements).

Preferably, the sedimentation trap component and the sedimentation element have the ability to contain material, such as seabed material. Typically, the containment capability of, for example, a sedimentation trapping component having a wall portion and one or more radial elements such as a base portion and a roof portion is enhanced by a retaining lip positioned on the base and/or roof portion. Where there is a base and roof portion, there is preferably a pair of convergent retaining lips.

Examples of the shape in side-aspect cross-section of components of the element are shown in FIGS. 2a to 2f.

Preferably, the sedimentation element is formed from a curved wall portion forming a cylinder from which extend radially annulus roof and base portions.

Optionally, the element has a hollow torus shape having a coequitorial cylindrical cavity in the internal wall thereof.

Since the weight of the sedimentation element, in situ, is in large part made up of the material of the seabed in/on which it is disposed, the relative density (or specific gravity) of the element in situ may be substantially similar to the seabed material and thus is in a dynamic equilibrium. An element and arrangement of elements (mat) having significantly sized gaps between the sedimentation trap components (gaps) and gaps, albeit smaller, between the sedimentation elements themselves (interstitial sites) allows movement of flowing sand with and to an extent between the elements and enables captured or trapped sediment to be readily returned to the seabed, which seabed remains accessible and is not immediately occupied by displacement with the scour protection elements themselves.

As used herein, the term mat may be used where the context allows to refer to an array or arrangement of interconnected sedimentation elements, preferably in a single layer.

In a preferred embodiment of the invention, the sedimentation element comprises a vehicle tyre or modified vehicle tyre. Typically, the tyres are re-used tyres (i.e. tyres that have served their purpose as vehicle tyres and require disposal, recycling or reuse).

It is particularly advantageous to utilize used vehicle tyres for this purpose for a number of reasons. Used tyres represent a significant waste-management problem and vast numbers of used tyres are accumulating in dumps and storage sites in the UK and in many other countries. Whilst alternative uses for used tyres are being sought, such as the formation of rubber chips for use as ground material in paths and playgrounds, or incorporation into concrete for structural materials or as sea defenses, their use remains insignificant compared to the waste management problem. In addition, used tyres for use in the seabed represent relatively low pollution risk as they degrade slowly over many years without leaching of noxious or harmful substances.

Any suitable material may be utilized in the sedimentation element of the present invention. If, for example, the sedimentation element is configured to trap and contain seabed material, it may be manufactured from thinly cast or lightweight metal such as aluminium, provided, preferably, that the element in situ (i.e. when positioned in normal operation and containing seabed material) has a specific gravity substantially similar to that of the seabed material (e.g. from 1.05 to 2) and that the element itself preferably has a specific gravity of greater than 1.03. This applies for any material from which the elements may be made, including thinly case or lightweight metals, molded plastics or reinforced fibrous materials (e.g. reinforced glass fibre or carbon fibre materials), or rubber.

Preferably, the material from which the sedimentation element is composed itself has a specific gravity (or average specific gravity) of substantially similar to the seabed material and in any case preferably from 1.05 to 2, preferably 1.2 to 1.5.

Optionally, the sedimentation element may be manufactured from modified cement, concrete or ceramic materials which are modified to have a closed cell structure (containing air or other foaming gas) or to contain a significant proportion of less dense particles (e.g. rubber fragments made from used tyres), which cause the cement, concrete or ceramic material to have a suitable specific gravity (e.g. within the range referred to above). Alternatively, the material may be composed of a silicon or other particulate-containing expanded polymer material having the desired specific gravity characteristics.

Preferably, the sedimentation element is manufactured from a rubber, vulcanized rubber or synthetic rubber or plastic material, preferably such materials that are utilized in tyre manufacture. Preferably, these materials have a specific gravity within the ranges referred to above.

The dimensions of the sedimentation element and of the mat (i.e. arrangement of interconnected sedimentation elements) may be selected according to the particular requirements of the application.

For a monopile or tri-pile or such like foundation (e.g. for a wind turbine), the mat may be selected to be of a size to prevent or inhibit scour formation or worsening. Preferably, the mat is sized to provide protection for at least a distance of 1× the diameter (D) of the monopile or tri-pile foundation about each side of thereof, more preferably at least 2.5×D and up to an optional distance of 10×D, more preferably 5×D. In providing scour protection about a 3.5 m diameter wind turbine monopile, for example, the anti-scour mat according to the invention preferably has a diameter of from about 10 m (including the aperture through which the monopile itself will pass) to about 75 m, more preferably of from about 20 m to about 40 m. This would be the preferred range of mat size for any monopile or tripile up to about 5 m in diameter (with 20 m dimension being the preferred minimum size for foundations up to about 10 m in diameter).

The mat may be selected to be any suitable shape, e.g. square, rectangular or elliptical, but preferably approximates to circular.

Preferably, the mat is formed of a single layer of sedimentation elements or is of a substantially constant depth (i.e. it may comprise of portions or incidences of multilayer elements provided the elements in multilayer portions are substantially shallower than those elements in the single layer, with the result that they act as effectively single layer elements). Optionally, incidences of multilayer elements of different depth to provide deepened protrusions from the mat may be incorporated as 'anchorage' elements. A substantially constant depth of mat enables the mat to better retain its dynamic integrity with the seabed material.

The mat is preferably formed of close-packed (i.e. touching) sedimentation elements. Preferably, the mat is formed of square close-packed or hexagonal close-packed elements.

For providing scour protection over a cable or pipeline, a mat may be constructed that is longitudinally extending for placement along the axis of the pipeline or cable (for the distance of particular scour problem) or multiple scour protection devices may be provided consecutively along the length of the cable or pipeline in problem areas. Typically, a cable or pipeline mat will have a width of from 2 to 10 m, preferably 3 to 5 m and most preferably about 4 m wide. The cable or pipeline scour protection mat will typically be placed over the pipeline and typically anchored in the seabed about the cable or pipeline. Optionally, however, a mat may be placed over and beneath the cable or pipeline and the mat provided with a means of fixing to the pipeline or the mats below and above the pipeline may be interconnected.

The characteristic dimensions of a sedimentation element itself may be selected according to the requirements of the environment in which it is placed. The element width, element depth (i.e. depth of trap component or portion), width of trap component or portion, and gap diameter are inter-related dimensions which together determine the effectiveness of the sediment trapping and scour prevention actions of a mat formed from the elements in a particular environment. The element width is typically about twice the width of a trap component or portion plus the gap diameter (distance between the trap diameter). In the case of a tyre-shaped element, for example, the element width is the total width of the element, the width of the trapping portion is the radial width of a base or roof portion of the element, the gap diameter is the diameter of the concentric hold in the centre of the tyre and the depth of the element is the height of the end wall of the tyre (the road gripping, tread bearing surface of the tyre, for the avoidance of doubt).

Preferably, the gap diameter is from 0.5 to 5× the width of the trapping component or portion (which for a tyre-shaped element would mean the gap diameter is 0.25× the diameter of the element to 2.5× the diameter of the element), more preferably from 1 to 3× the width of the trapping component, still more preferably 1.5 to 2.5× the width and preferably 2× the width.

Preferably, the aspect ratio of the sedimentation element (i.e. the aspect ratio of the trapping components), being the width or radial width r of the trapping component divided by the section depth d of the trapping component, is from 0.5 to 2, preferably 0.75 to 2.25 and most preferably about 2.

Preferably, the element has a width from 10 cm to 2 m, more preferably 20 cm to 1 m, still more preferably, 30 cm to 50 cm and most preferably 35 cm to 45 cm.

Preferably the radial width of the trapping component or portion is from 0.1 to 1× the element width, preferably 0.25× element width and a depth of 0.1 to 1× the element width, preferably 0.25× the element width.

Preferably, the element has a depth in the range from 1 m to 5 cm, more preferably 50 cm to 10 cm and still more preferably 25 cm to 15 cm.

Sedimentation elements for use in accordance with the present invention, for example used vehicle tyres, are preferably modified to have apertures formed in the upper part of the side wall of the element or in the roof portion to allow escape of trapped air during the installation of a group of interconnected elements. Submergence of a mat or portion thereof without air-release apertures would render the procedure more difficult and the mat undesirably buoyant. There may be at least two and preferably several such apertures formed in each element. Typically, such apertures are of a size from 1 cm$^2$ to about 5 cm$^2$ and may be of any suitable shape, e.g. circular. Apertures may also be formed in the side walls or in the base or roof portions to enable fixing of one element to another. Alternatively, a fixing may be formed (e.g. by molding in situ) in an element for use in accordance with the present invention.

Another aspect of the invention, referred to above, concerns a method of installing the scour protection system or mat of sedimentation elements about a seabed mounted marine energy device, foundation or monopile/tri-pile for an offshore wind turbine. The arrangement of elements may be installed at the time of installation of the seabed-mounted foundation or renewable energy device or anchor thereof. Alternatively, the arrangement of elements may be installed to repair an established scour by disposing the arrangement of elements significantly larger than the scour about the seabed-mounted foundation or renewable energy device or anchor thereof or infilling the scour and disposing the arrangement of elements over the infill.

Preferably in installing the scour protection system, sections of a mat are formed on shore or on a vessel for installation of the system and a series of sections installed in place. The sections preferably have dimensions of a desired length up to say 20 m and a width of up to say 10 m. In the case of used tyre sedimentation elements, the section may be composed of, for example, 150 to 300 tyres, typically about 200 tyres (for a wind turbine monopile protection system comprising from 800-1200 tyres). Preferably, the sections for transportation and installation have a width of up to about 8 m, more preferably up to about 5 m (e.g. in the range 3-5 m) and preferably a length of up to about 12 m, more preferably up to about 8 m (e.g. in the range 4 to 8 m). The preferred dimensions should utilized up a number of interconnected elements in the range 25 to 100, preferably 40 to 80. The preferred dimensions are ideal for maximizing the production of substantial sections on land whilst facilitating transport and installation about an offshore wind turbine, which sections will then be interconnected in situ.

The lifting or transportation frame typically comprises at least one, more likely two, longitudinal support members and at least two and preferably several more lateral support members or cross members. In a preferred embodiment, the frame comprises a box section with several parallel cross members within the section. Eye links are preferably provided at distal ends of the frame for engagement of a lifting cable system for use with the frame. The frame is provided with a plurality of element engaging means for releasably engaging with the elements of the mat to allow the transporting frame to lift and transport the mat or portion thereof (which may be referred to as quick release strops). Optionally, each individual engaging element is associated with a mechanism for engagement or disengagement with the element or alternatively a single engagement/disengagement mechanism may be operated to control two or more or all of said means centrally.

Sections of a scour protection system may thereby be disposed in the desired location about, e.g. a wind turbine foundation and connected together in situ (starting, for example, with the elements adjacent the base of the wind turbine tower and working radially outward).

The invention provides, in another aspect, the use of rubber tyres fastened together in clusters to provide anti scour matting. This matting is then filled with the same medium as where they are placed.

Advantages of the invention include: ease of construction using readily available materials; ease of installation (not as heavy as conventional matting and safer); minimal impact on marine environment and ecology; lifetime of the tyres of approximately 100 years so will at least outlive the working lifetime of the monopile it is protecting.

In assembly, the elements (e.g. tyres, which may be washed with soapy water to remove any residual oil etc) are placed in uniform pattern on dry land (or a platform of a vessel) and fixed together (e.g. by drilling and bolting) at (preferably all) junctures of adjoining elements to form a mat of interconnecting elements. Holes may be provided in each element to allow air to be expelled when the element is submerged. The assembly may be then connected to a lifting frame and lifted to the desired location, submerged and released when in the desired position. Several elements (e.g. end tyres) may be anchored with a sand anchor. The mat once configured in place may be covered in sand or gravel to keep it in place.

In another aspect, there is provided a scour protection mat comprising a plurality of interconnected elements which have a density (or specific gravity) in situ of substantially similar to the medium in which it is disposed.

The invention will now be described in more detail, without limitation, with reference to the accompanying Figures.

Figure 3:
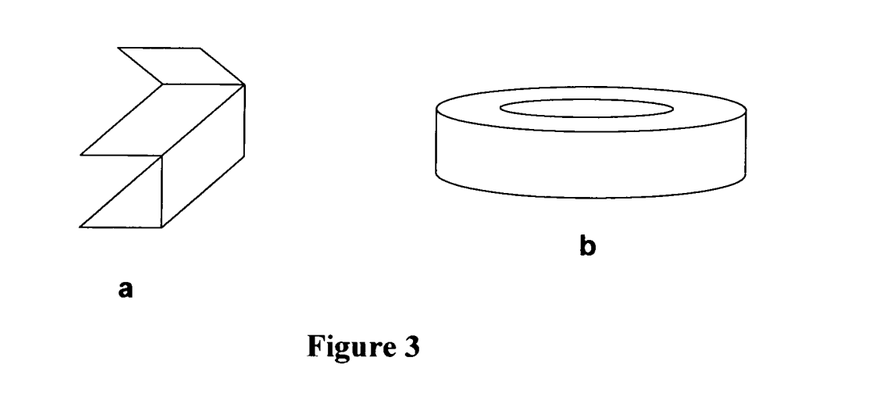
FIGS. 3a and 3b are illustrations in a perspective view of sedimentation elements or a portion thereof for use in accordance with the present invention.

The sedimentation elements may be of any suitable configuration. An example of a sedimentation trap component is shown in FIG. 3a, which is formed with a plan according to FIG. 1c and a cross-sectional profile according to FIG. 2d. A preferred sedimentation element (FIG. 3b) has a trap component plan according to FIG. 1h and a cross-sectional profile according to FIG. 2d, or preferably 2e with retaining lip.

Figure 4:
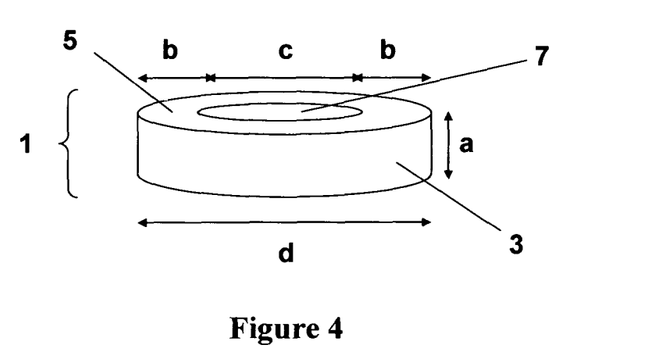
FIG. 4 is an illustration of a preferred sedimentation element according to the present invention.

In FIG. 4, a preferred embodiment utilizes a ring-shaped element 1, such as a tyre, has an element width e, a wall 3 (in the form of a cylinder) with depth a, a roof/base portion 5 with radial width b and a concentric central hole 7 with gap diameter c.

Figure 5:
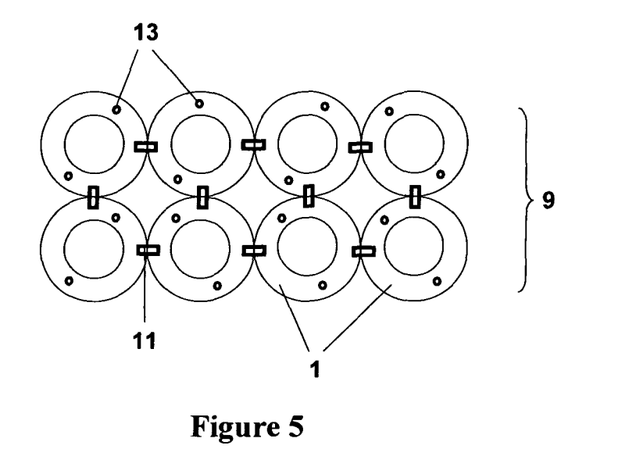
FIG. 5 is a plan view of an apparatus or device according to one embodiment of the present invention.

FIG. 5 shows a preferred embodiment of the invention in which a scour prevention mat or portion thereof 9 is formed of a plurality of ring-shaped sedimentation elements 1 connected by fixings 11 to form a square close-packed planar arrangement. The sedimentation elements 1 are provided with apertures 13 to allow the escape of air during submergence of the mat 9 into the desired location. The mat 9, as shown in FIG. 6, comprises a single layer of elements 1.

Figure 6:
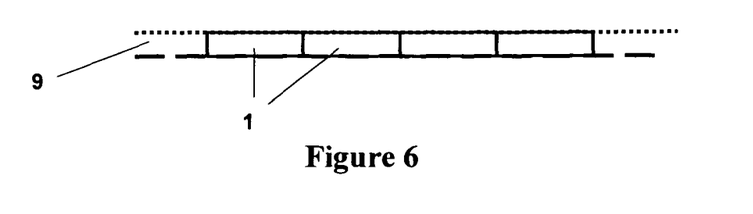
FIG. 6 is a side aspect of an apparatus or device according to an embodiment of the present invention.
Figure 7:
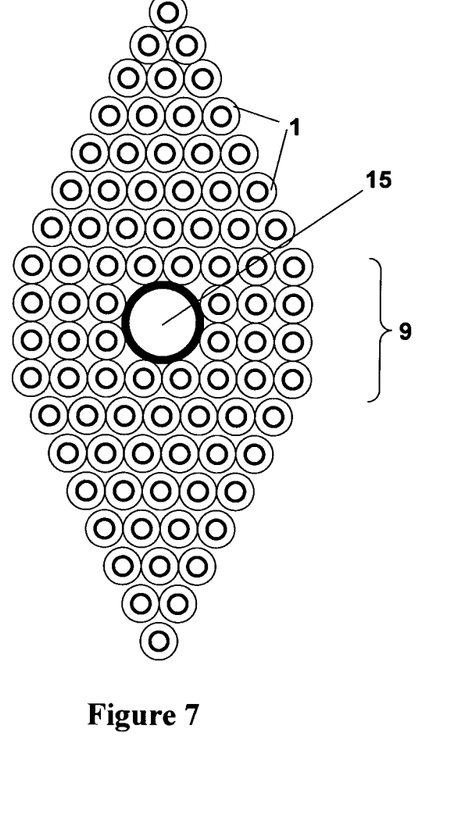
FIG. 7 is an illustration of a modular array of sedimentation elements about a wind turbine monopile according to the present invention.
Figure 8:
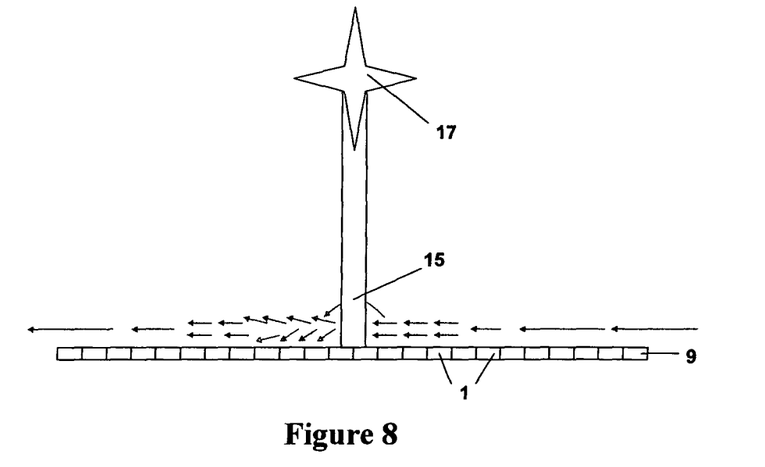
FIG. 8 illustrates a side aspect of an array of FIG. 7.
Figure 9:
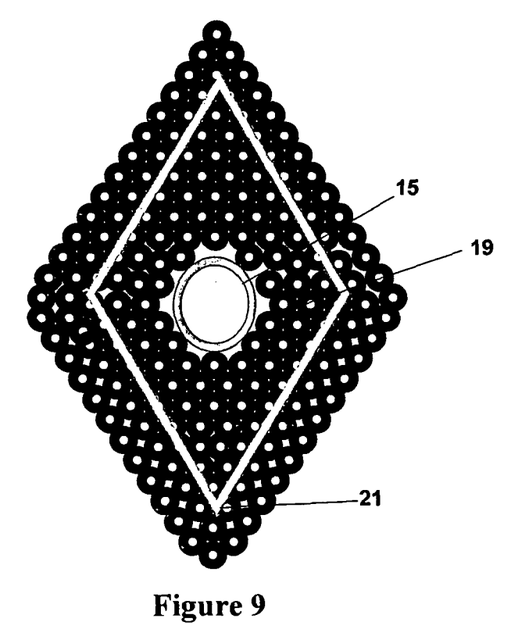
FIG. 9 is a further illustration of a modular array of sedimentation elements about a wind turbine monopile according to the present invention.

In FIG. 6, a scour prevention mat 9 of multiple sedimentation elements 1 is located about a monopile 15 (see FIG. 7) of, for example, a wind turbine 17 (FIG. 8), in a single layer and provides protection about a potential scour area 19 defined by the illustrative boundary 21 (FIG. 9).

The mat 9 or portion thereof is installed in position by assembling the mat 9 or portion thereof on land or on a ship and maneuvered by releasably fixing to the mat 9 or portion thereof a frame 23 connected to the mat 9 by a number of releasable engagement means 25, the frame 23 being secured via lifting eyes 39 on the frame with a lifting cable arrangement 27 for moving the frame 23 and attached mat 9 into position (see FIG. 8).

The frame 23 for lifting a mat 9 of sedimentation elements 1 has, as shown in FIG. 9, two parallel longitudinal members 29 and a plurality of cross members 31 with a plurality of releasable engagement members (not shown) secured to the longitudinal and cross members to temporarily secure the mat to the frame in a sufficient number of locations.

Figure 10:
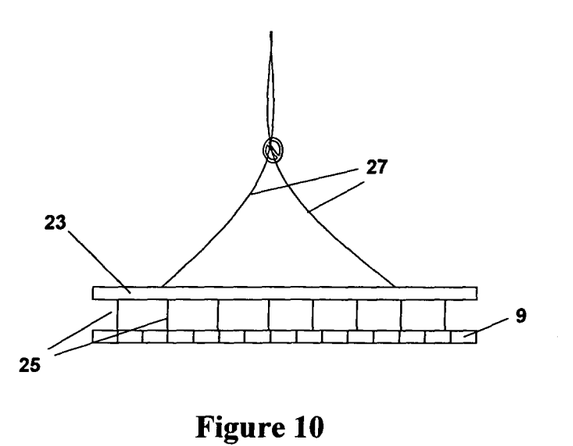
FIG. 10 illustrates a modular array of sedimentation elements attached to a transportation frame.
Figure 11:
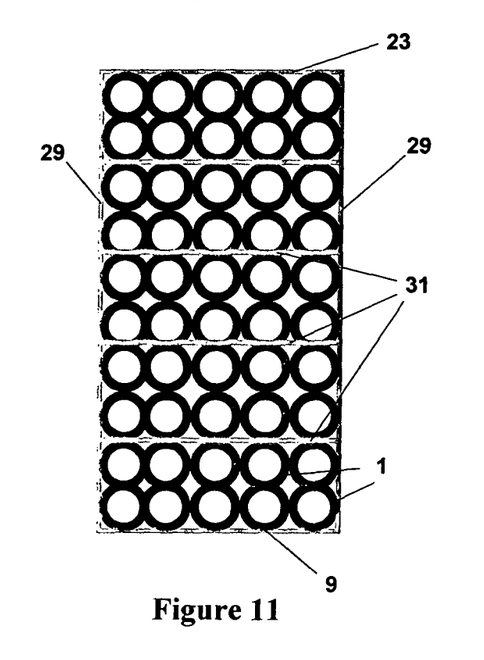
FIG. 11 is a plan view of a modular array of sedimentation elements with transportation frame.
Figure 12:
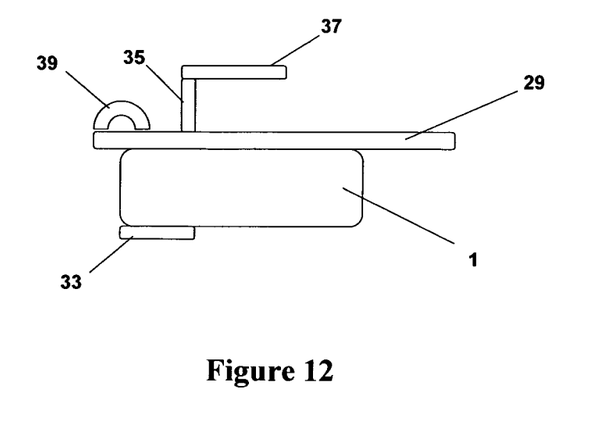
FIG. 12 is an illustration of the connection of a transportation frame to a single sedimentation element.

A releasable engagement element is shown in FIG. 10 in relation to a portion of the frame 23 in engagement with a ring shaped sedimentation element 1 in the form of a tyre. An engaging member 33 is rotatably mounted to a vertical axle 35 which is mounted on the longitudinal member 29 and caused to engage or disengage using lever 37.

The invention has been described with reference to preferred embodiments. However, it will be appreciated that variations and modifications can be effected by a person of ordinary skill in the art without departing from the scope of the invention.

The invention claimed is:

1. A method for the inhibition or reduction of seabed scour about a seabed-located device comprising a seabed-mounted foundation, offshore wind turbine pile or renewable energy device or anchor thereof, the method comprising disposing a single layer arrangement of interconnected sedimentation elements directly on the seabed in an area surrounding and/or adjacent to said seabed-located device, the sedimentation elements being formed of a material having a specific gravity in the range from 1.05 to 2, in that the sedimentation elements provide a sedimentation trapping capability in situ and are configured to contain and/or retain trapped seabed sediment material to thereby enable captured or trapped sediment material to readily return to the seabed and in that the structural properties of the sedimentation elements and/or the interconnective arrangement of elements is such that the elements do not themselves cause further scour nor further displace supporting seabed material.

2. A method according to claim 1, wherein said structural properties of the sedimentation element comprise an average specific gravity in situ of substantially similar to that of seabed material in/on which it is disposed.

3. A method according to claim 1, wherein the element in situ is capable of partial suspension and/or buoyancy in mobilized seabed material.

4. A method according to claim 1, wherein the specific gravity is in the range 1.2 to 1.5.

5. A method according to claim 1, wherein the sedimentation elements are in square close packed or hexagonal close packed arrangement.

6. A method according to claim 1, wherein the sedimentation element comprises one or more of the following:
   a: at least two trap components separated by a gap diameter, wherein the gap diameter is between 1 and 3 times the radial width of each trap component;
   b: trapping components having at least a roof or base portion and a wall portion and having dimensions characterized as a radial width and a depth, wherein an aspect ratio, being the radial width divided by the depth, of from 0.5 to 3;
   c: a radial diameter in the range from 1 m to 15 cm; and
   d: a depth in the range 50 cm to 10 cm.

7. A method according to claim 1, wherein the element comprises at least a roof or base portion and a wall portion, which is provided with at least one aperture in the roof portion or upper part of the wall portion to allow air to escape from the element during submerging in a liquid.

8. A method according to claim 1, wherein the element is made from a material selected from rubber, vulcanized rubber or synthetic rubber material.

9. A method according to claim 1, wherein the sedimentation element is a vehicle tyre.

10. A method according to claim 1, wherein the arrangement forms a mat of sedimentation elements having a lateral dimension of from 4 to 20 m.

* * * * *